G. BEVITT.
Sugar Mill.
No. 52,127.
Patented Jan'y 23, 1866.
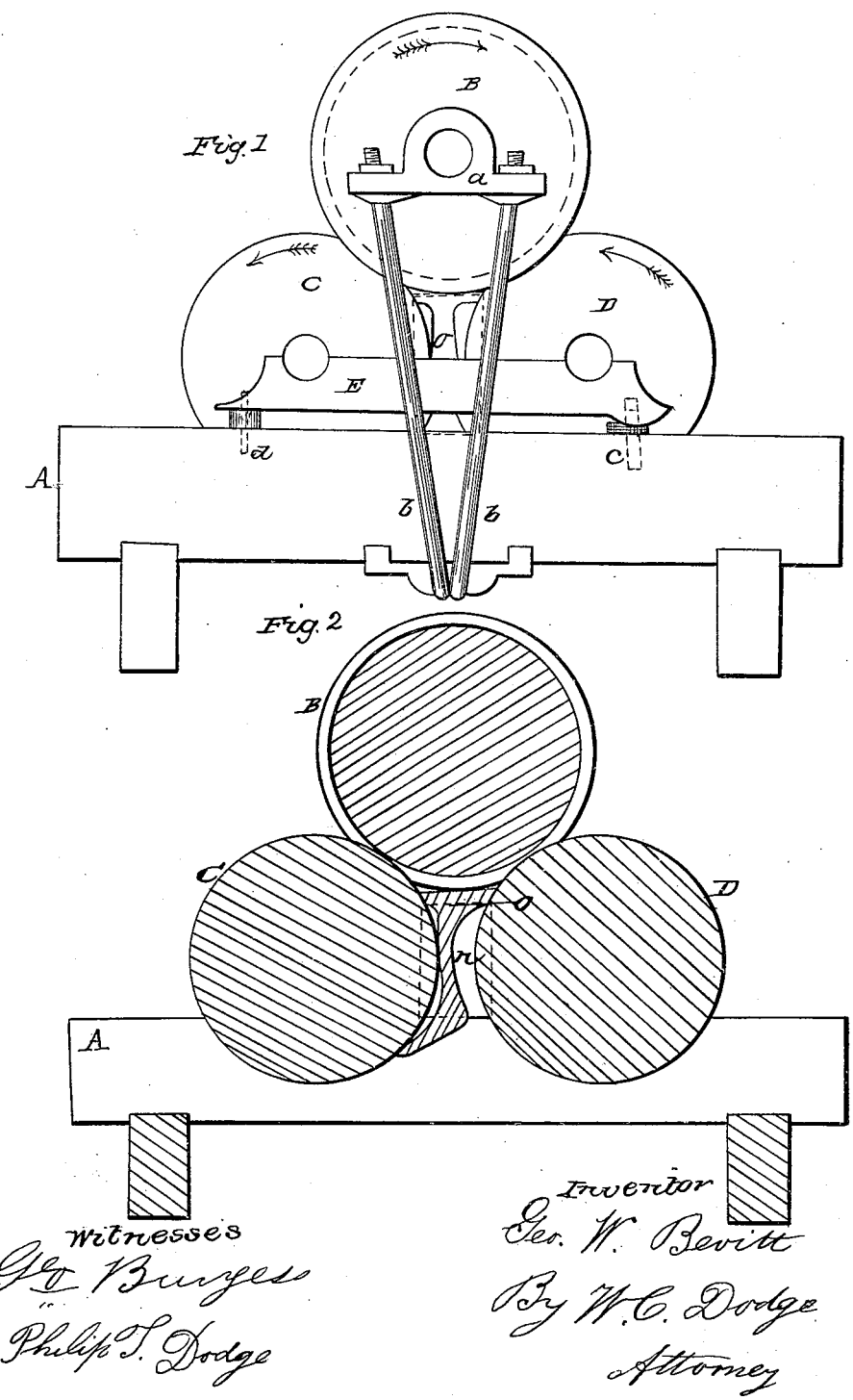

UNITED STATES PATENT OFFICE.

GEORGE BEVITT, OF MADISON, WISCONSIN.

IMPROVEMENT IN SUGAR-MILLS.

Specification forming part of Letters Patent No. 52,127, dated January 23, 1866.

*To all whom it may concern:*

Be it known that I, GEORGE BEVITT, of Madison, in the county of Dane and State of Wisconsin, have invented certain new and useful Improvements in Mills for Crushing Cane; and I do hereby declare that the following is a full, clear, and exact description thereof, reference being had to the accompanying drawings, making part of this specification.

Figure 1 is an end elevation, and Fig. 2 a vertical section, of the same.

The nature of my invention consists in mounting the lower rollers in bearings that are adjusted by means of a spring, and in the use of a novel scraper arranged between the rollers.

To enable others skilled in the art to construct and use my invention, I will proceed to describe it.

A represents the frame, which may be made of wood, in any desired form, for supporting the rollers. Upon this frame I mount three horizontal rollers, B, C, and D, arranged as shown in the drawings. The lower rollers, C and D, are mounted on a bearing, E, consisting of a metal piece of sufficient length to afford a bearing for the journals of both rollers, as shown in Fig. 1. This piece E is supported at one or both ends upon a rubber or gutta-percha spring, $d$, as shown, a piece of leather, $c$, being usually inserted under the opposite end, in case a spring be used at one end only. Bolts (shown in dotted lines in Fig. 1) protrude from the upper surface of the frame A and fit into holes in the under side of E near each end, passing, also, through the spring $d$ and the leather $c$, thereby holding them all in place.

The upper roller, B, is mounted in any suitable manner, though I prefer the plan shown in the drawings, in which $a$ is a strong metal box secured to the frame A by the stirrups $b\ b$, which pass around the bed-piece of the frame at each end of the machine, and are provided with nuts at their upper ends, by which the box $a$, and with it the roller B, can be adjusted nearer to or farther from the lower rollers, as may be desired. In the central space between these three rollers I then place a metallic scraper, O, the form of which is clearly shown in Fig. 2. This scraper O is so arranged that its edges, at the upper side, come in contact with the rollers C and D, while its lower edge rests against the roller C on the lower side thereof, as shown in Fig. 2. In order to prevent the scraper O from moving endwise it may be provided with a flange, $n$, at each end, which will engage over the end of the lower rollers, and thus hold it in place. The object of this scraper is twofold: first, it acts as a guide to prevent the canes from passing down between the two lower rolls, and at the same time its lower edge serves as a scraper to keep the roller C cleaned of the adhering substance, the upper right-hand edge performing the same office, to a greater or less extent, with the roller D.

The rollers are each provided with a gear-wheel at their opposite ends in the usual manner, by which they are caused to revolve in the direction indicated by the arrows, the power being applied in any suitable manner.

If desired, the upper roller may be provided with a flange at the ends, as indicated in Fig. 1, to prevent the cane from working out at the ends of the rollers.

By mounting the rollers in yielding bearings, as described, I prevent the breaking of the journals, which frequently happens when too much cane, or any hard and unyielding substance happens to get between them.

The scraper O serves to keep the rollers clean and free from the crushed substance, which is apt to adhere to them more or less when no provision of this kind is made, and thus the rollers present at all times a smooth clean surface to the cane to be crushed. From the peculiar form and location of the scraper, it is obvious that any wear that may occur only tends to keep its scraping-edges sharp and in good condition for operation.

Having thus fully described my invention, what I claim is—

1. The combination and arrangement of the bar E and spring $d$, for supporting the rollers C and D, as shown and described.

2. The scraper O, constructed as shown and described, and arranged to operate in combination with the rollers C and D, as set forth.

GEORGE BEVITT.

Witnesses:
J. H. CARPENTER,
L. N. CARPENTER.